Figure 1:
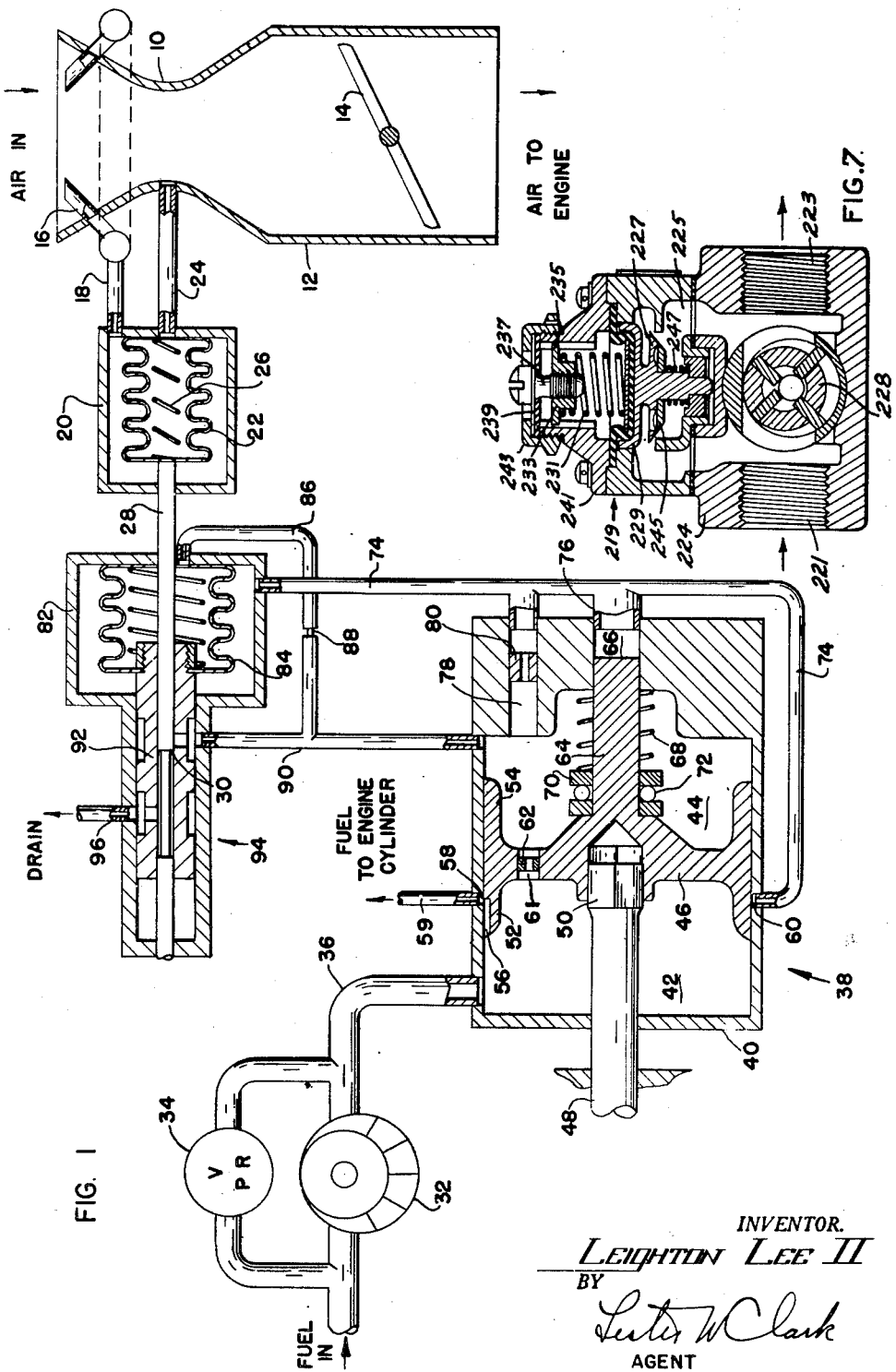

Aug. 9, 1949. L. LEE, II 2,478,288
CONTROL APPARATUS FOR INTERNAL-COMBUSTION ENGINES
Filed March 26, 1945 4 Sheets-Sheet 1

INVENTOR.
LEIGHTON LEE II
BY
Luter W Clark
AGENT

Aug. 9, 1949. L. LEE, II 2,478,288
CONTROL APPARATUS FOR INTERNAL-COMBUSTION ENGINES
Filed March 26, 1945 4 Sheets-Sheet 4

INVENTOR.
LEIGHTON LEE II
BY
Lester W Clark
AGENT

Patented Aug. 9, 1949

2,478,288

UNITED STATES PATENT OFFICE 2,478,288

CONTROL APPARATUS FOR INTERNAL-COMBUSTION ENGINES

Leighton Lee, II, West Hartford, Conn., assignor, by mesne assignments, to Niles-Bement-Pond Company, West Hartford, Conn., a corporation of New Jersey Application March 26, 1945, Serial No. 584,867

25 Claims. (Cl. 123—25)

The present invention relates to control apparatus for internal combustion engines, and particularly to apparatus for controlling the supply of fuel to such an engine.

Fuel supply systems for internal combustion engines may, generally speaking, be classified either as carburetor type systems, in which the fuel is mixed with the air in the air induction system of the engine, after which the mixture is distributed thru the intake manifold to the cylinders, or as distributor type systems, where the fuel charge for the engine is broken up by a fuel distributor mechanism into small charges for the individual cylinders, and these charges are conveyed to the cylinders by suitable conduits. In distributor type systems, the fuel may be fed directly into the cylinders, or it may be fed to separate spray nozzles, one for each cylinder, which are located in the intake manifold adjacent the intake valves of the cylinders. The present invention relates particularly to the distributor type of fuel supply system.

An object of the present invention is to provide a distributor type fuel supply system for an internal combustion engine, including improved means for measuring and controlling the flow of fuel to the engine.

A further object is to provide an improved system for controlling the flow of fuel to an internal combustion engine, whether or not the system is of the distributor type.

Another object of the present invention is to provide, in connection with the fuel supply system of an internal combustion engine, improved means for supplying to the engine a supplementary fluid, and for controlling the supply of that fluid in accordance with the rate of flow of fuel to the engine.

Another object is to provide improved flow regulating apparatus.

Another object is to provide improved mechanism for distributing small quantities of fuel successively to the cylinders of an internal combustion engine.

A further object is to provide improved valve mechanism for use in a system of the type described.

Another object is to provide improved valve mechanism which is continuously rotated, so that it may be freely translated by a small force without the possibility of sticking.

A further object is to provide an improved valve mechanism which may be readily constructed as a unit with a rotary pump such as is commonly used to pump fuel on certain types of internal combustion engines.

Figure 2:
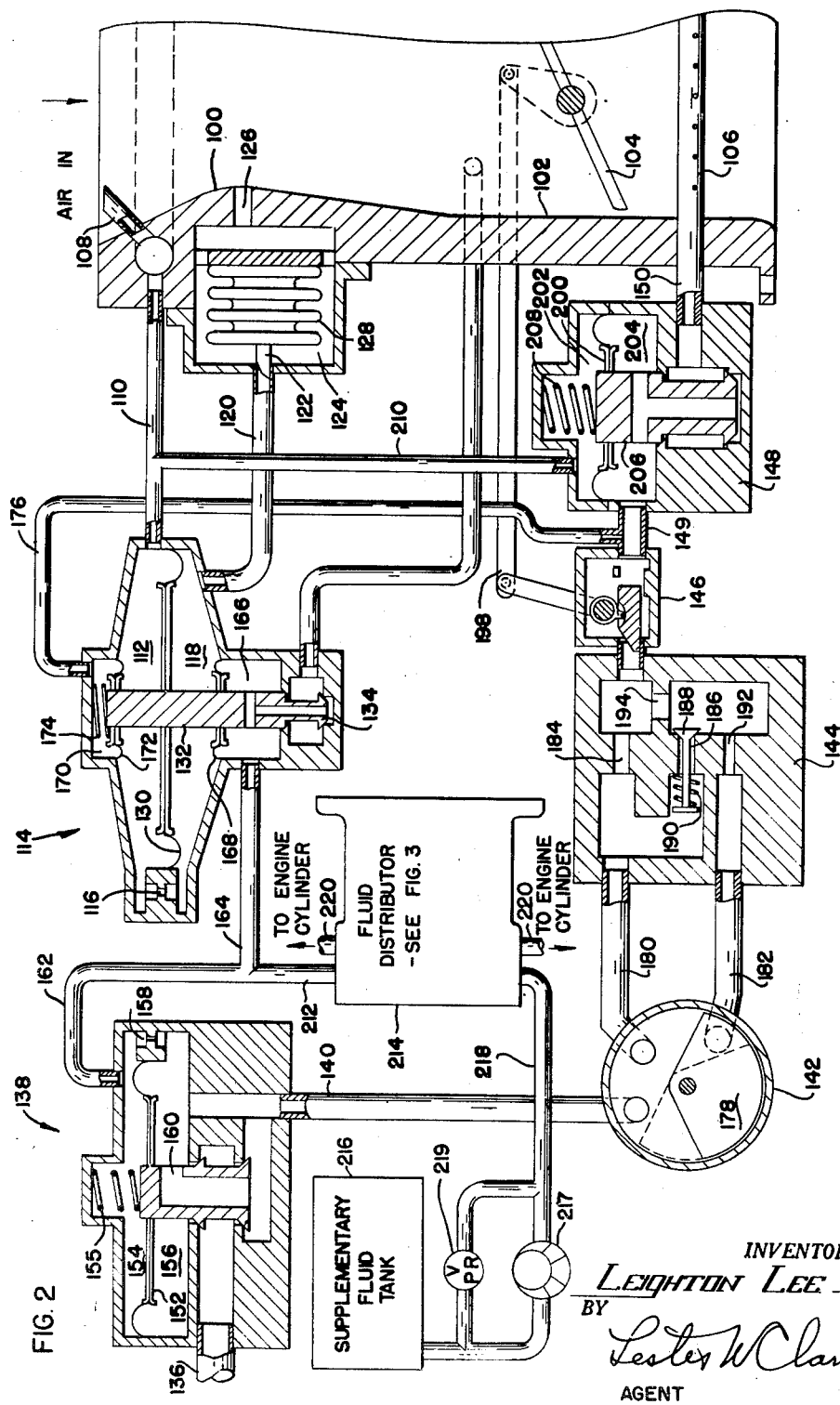
Figure 3:
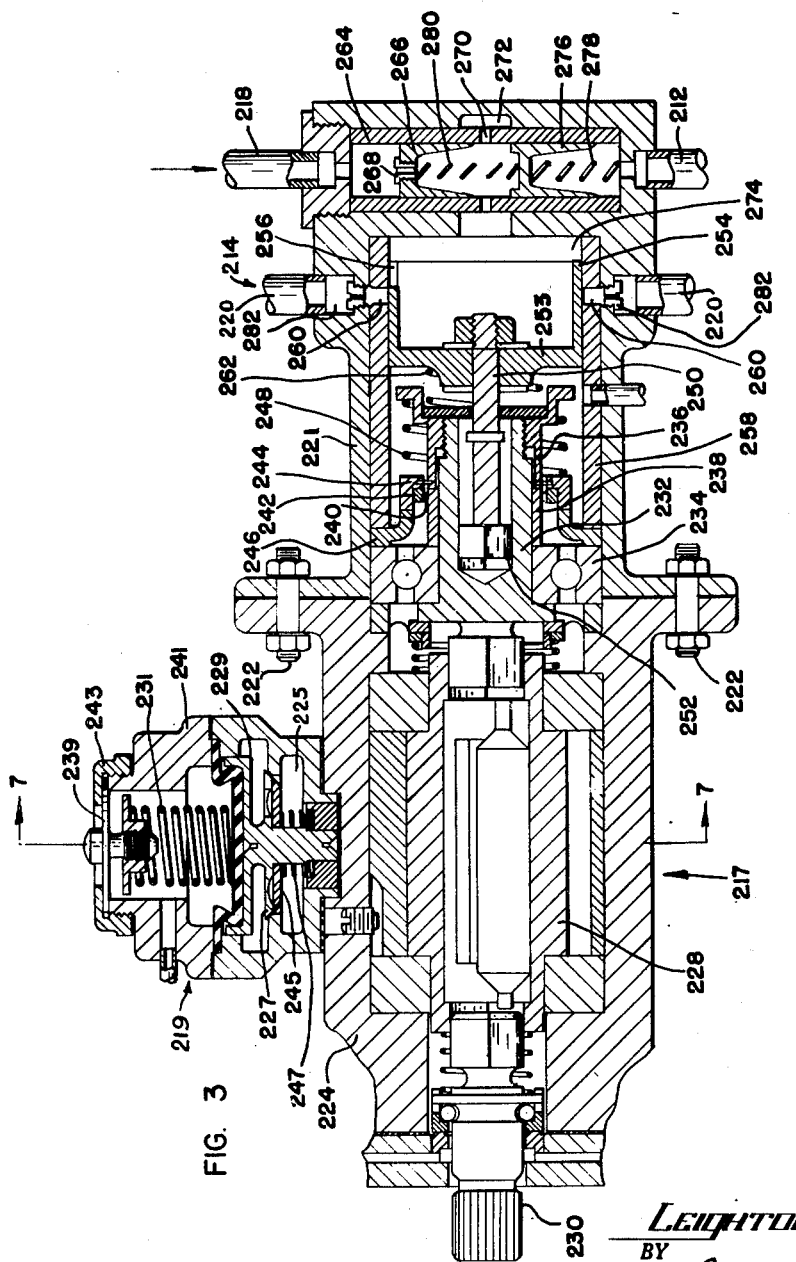

Other objects and advantages of the present invention will become apparent from a consideration of the appending specification, claims and drawings, in which Figure 1 illustrates, somewhat diagrammatically, a fuel supply system for an internal combustion engine embodying certain principles of my invention, Figure 2 illustrates a fuel supply system which includes means for supplying supplementary fluid to the cylinders of the engine and for controlling the supplementary fluid supply in accordance with the rate of fuel flow, Figure 3 illustrates a combined rotary pump and fuel distributor valve mechanism which is shown diagrammatically in Figure 2.

Figure 4:
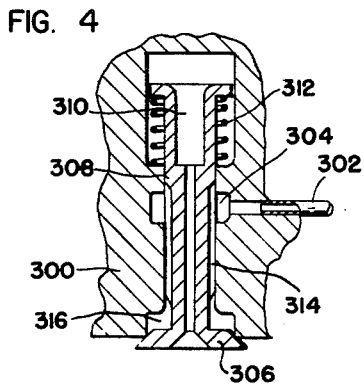
Figure 5:
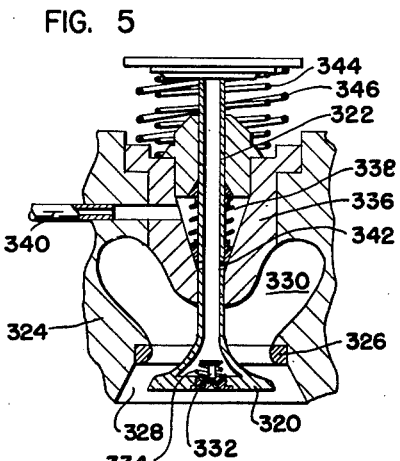
Figure 6:
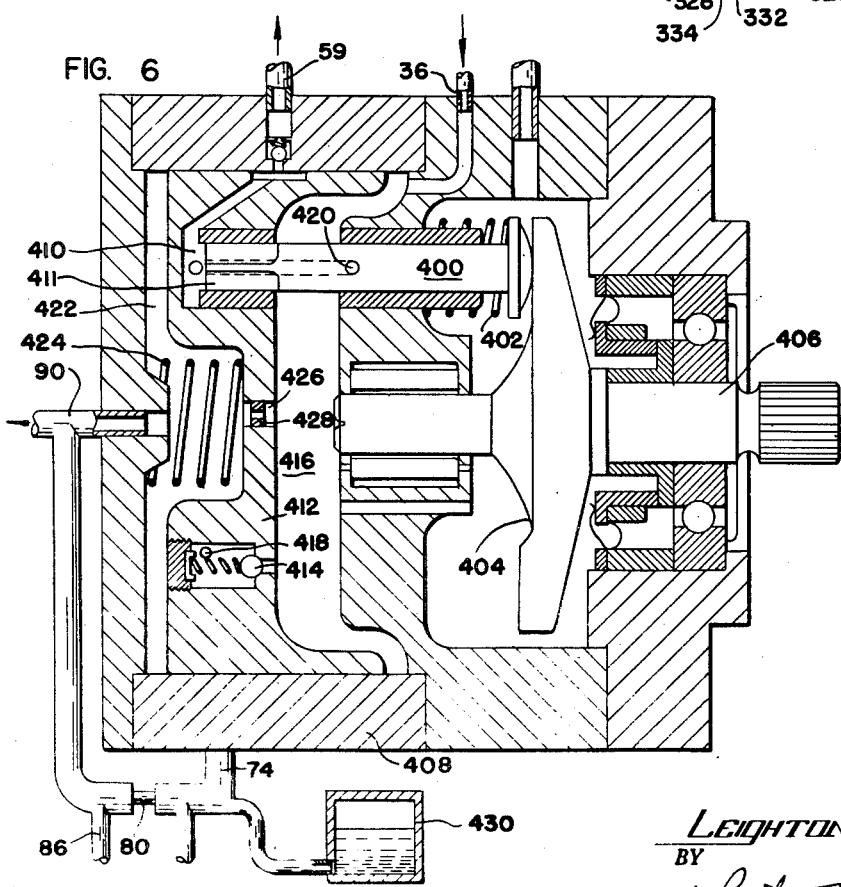

Figure 4 illustrates an injector nozzle which may be used to supply fuel to a cylinder of an internal combustion engine, and which is adapted for use in connection with the systems of Figures 1 and 2, Figure 5 illustrates a modified form of injector nozzle which may be substituted for that of Figure 4, Figure 6 illustrates a modified form of fuel pumping and distributing mechanism which may be used in place of the fuel distributing mechanism of Figure 1, and Figure 7 is a cross-sectional view taken on the line 7—7 of Figure 3.

Figure 1

There is illustrated in Figure 1, an air and fuel supply system for an internal combustion engine. The air flowing to the engine passes through an air induction system including a Venturi restriction 10, and a passage 12. A throttle 14, is located in the passage 12, to control the flow of air to the engine.

A pressure differential is set up between the entrance and throat of the venturi 10, which is a measure of the rate of flow of air to the engine. The total, or dynamic pressure at the air entrance is communicated through a plurality of impact tubes 16, whose open ends receive the impact of the entering air, through a passage 18 to the interior of a casing 20. A bellows 22, mounted inside the casing 20, has its interior connected thru a passage 24 to the throat of venturi 10.

The bellows 22 is therefore subjected to a difference between its internal and external pressure, which is a measure of the rate of flow of air to the engine. This pressure difference may be compensated, by any of several known devices, for changes in the density of the air flowing to the engine. For example, a density compensating mechanism such as that shown in Figure 2 may be used. Since the bellows is flexible, the position of its free end is a measure of the rate of flow of air to the engine. If desired the bellows 22 may be provided with an internal spring as shown in 26.

The free end of bellows 22 is attached to the stem 28 of a valve 30.

The fuel supply for the engine comes from a suitable tank or reservoir, (not shown), and is forced to the engine by a pump 32, which is diagrammatically indicated as being of the rotary sliding vane type, and which is usually engine driven. A pressure relief valve indicated at 34 maintains a substantially constant pressure at the outlet of the pump 32 independently of the quantity of fuel pumped thereby. Fuel discharged by pump 32 passes through a conduit 36 to a fuel distributor generally indicated at 38.

The distributor 38 includes a cylindrical casing 40 whose interior is separated into two cylindrical chambers 42 and 44 by a piston 46. The piston 46 is rotated by means of a shaft 48, preferably driven by the engine. The shaft 48 is provided with a squared end 50 which mates with a square recess in the piston 46, so that the piston 46 may be translated in the cylinder 40 with respect to the shaft 48. The piston 46 is provided with skirts 52 and 54 on its opposite faces. The skirt 52 is slotted as indicated at 56 to provide fluid communication between the chamber 42 and a plurality of circumferentially spaced ports, two of which are shown at 58 and 60. A passage 61 extends through the piston 46 and provides fluid communication between the chambers 42 and 44. A fixed restriction 62 is located in the passage 61. A rod 64 extends to the right from the center of the piston 46 into a chamber 66 formed in the end of the cylinder 40. A spring 68 encircles rod 64, and is retained between the right end of cylinder 40 and a retainer 70, which is separated from the piston 76 by a suitable bearing 72. The spring 68 is under compression, so that it biases the piston 46 for movement to the left.

The number of ports 58, 60, is greater by one than the number of cylinders in the engine. Each of the ports, with the exception of port 60, is connected with a suitable injector nozzle, such as that shown in Figure 5, in one of the engine cylinders. The port 60, which will be hereinafter referred to as the "sampler" port, is connected through conduits 74 and 76 to the chamber 66. The conduit 74 is also connected through a passage 78 with the chamber 44. A fixed metering restriction 80 is located in the conduit 78. The conduit 74 is also connected to the interior of a chamber 82, in which is mounted a flexible bellows 84. The interior of bellows 84 is connected through a conduit 86 having a restriction 88 therein to a conduit 90. The free end of bellows 84 is attached to a seat member 92 which cooperates with the valve 30 previously described. The conduit 90 conveys fuel from the chamber 44 in the distributor 38 to a control valve mechanism 94, which includes the valve 30 and the seat 92, previously described. The fuel passing through the valve mechanism 94 is discharged through a drain conduit 96 to the fuel tank or to the inlet of the pump 32. It may be seen that the exterior of bellows 84 is subject to the pressure upstream from restriction 80 and that the interior of bellows 84 is subject to the pressure downstream of restriction 80. The pressure differential which acts on bellows 84 and hence positions its free end, is therefore a measure of the rate of fuel flow through restriction 80.

Operation of Figure 1

As discussed above, the position of valve 30 is a measure of the rate of flow of air to the engine. The rate of flow of fuel to the engine is determined by the position of piston 46, since the position of that piston determines the amount of restriction of the ports 58 and 60 by the end of the slot 56. As the piston rotates, the fuel is successively distributed to the cylinders of the engine in small quantities which are determined by the position of the piston.

The position of the piston 46 in turn depends upon the difference between the pressures in chambers 42 and 44, the pressure in chamber 66, and the strength of spring 68. The pressure in chamber 42 is maintained substantially constant by the action of the pressure relief valve 34. As hereinafter explained, the pressure in chamber 66 is also maintained constant. The strength of the spring 68 can be regarded as constant, at least over the range of travel of piston 46 necessary to completely open and close the ports 58 and 60. It may therefore be seen that the position of piston 46 and hence the flow of fuel to the engine is determined chiefly by the pressure in chamber 44. The pressure in chamber 44 is in turn determined by the valve mechanism 94. The opening of the valve mechanism 94 is in turn determined by the two bellows 22 and 84. The bellows 22 operates in accordance with the rate of air flow through the passage 12 and the bellows 84 operates in accordance with the rate of fuel flow thru the restriction 80.

The rate of fuel flow through the restriction 80 is a measure of the rate of flow of fuel to the engine. It may be seen that the amount of fuel discharged through port 60 is equal to the amount of fuel discharged through each of the ports 58 connected to the engine cylinders if the pressure in the conduit 74 is equal to the pressure in the lines 59 leading to the engine cylinders. As described below in connection with Figures 4 and 5, a suitable nozzle mechanism may be used at the engine cylinders which maintains the pressure in the supply lines 59 substantially constant at all times when the nozzle is open.

A change in pressure in chamber 44 tends to be transmitted through the jet 80, to chamber 66. A decrease in pressure in chamber 44 therefore tends to decrease the pressure in chamber 66. However, the decrease in pressure in chamber 44 causes a movement of piston 46 to the right, thereby increasing the effective area of the ports 58 and 60, so as to increase the pressure in chamber 66. If the restriction 80 is properly chosen and proportioned with respect to the size of ports 58 and 60, the system may be made to maintain a constant pressure in the chamber of 66, and hence in the conduit 74, for all positions of the piston 46. Furthermore, this constant pressure may be made the same as the pressure maintained in the lines 59 by the injector nozzles. If the pressure in conduit 74 is maintained equal to that of lines 59, it may be seen that the quantity of fuel flowing through the restriction 80 is proportional to, and therefore may be used as a measure of, the total quantity of fuel flowing to the engine.

The pressure in chamber 66 is given added stability by the action of that pressure on the end of the piston rod 64. It may be seen that a change in pressure in chamber 66 produces a change in the position of piston 46, so as to tend to restore the pressure in chamber 66 to its previous value. For example, an increase in pressure in chamber 66 moves the piston 46 to the left, reduces the area of the distributor ports and thereby reduces the pressure in chamber 66 to its previous value.

The valve mechanism 94 operates to control the pressure of chamber 44 so as to maintain the fuel flow through the restriction 80 proportional to the rate of flow of air to the engine. For example, if the air flow increases, the pressure differential acting to collapse bellows 22 increases, thereby moving valve 30 to the right, and opening it wider. This reduces the pressure in chamber 44, causing piston 46 to move to the right and thereby to increase the fuel flow to the engine. At the same time, the pressure drop across restriction 80 is increased, so that bellows 84 is collapsed and the seat member 92 is moved to the right to reduce the opening of valve mechanism 94. As the fuel flow increases sufficiently to balance the increased air flow, the seat member 92 reaches a position where further decrease in the pressure in chamber 44 is prevented, and the system remains balanced.

The restriction 88 in the conduit 86 operates to delay the response of the fuel flow measuring bellows 84 to changes in the fuel flow caused by a change in position of the valve mechanism 94. Therefore, an increase in the rate of air flow to the engine produces a disproportionate increase in the fuel flow, which remains temporarily out of proportion to the increase in the air flow until the pressures on the opposite sides of restriction 88 are balanced. The restriction 88 therefore serves as an acceleration responsive control device, in that it causes a disproportionate increase of the fuel flow upon acceleration of the engine. By way of example, when the air flow increases and valve 30 opens in response to the increased air flow, the pressure inside bellows 84 does not drop as fast as the pressure in conduit 90 and chamber 44, because of the action of restriction 88. Therefore, the seat member 92 remains farther to the left than it would if restriction 88 were omitted. This permits the pressure in chamber 44 to remain at a lower value, temporarily, and hence produces a faster and greater movement of piston 46. The piston 46 moves farther to the right than is necessary to rebalance the system, thereby producing a temporary enrichment of the fuel-to-air ratio. Equilibrium is gradually restored to the system after valve 30 becomes stationary, as the pressures on opposite sides of restriction 88 become equalized.

The use of the sampler principle in measuring the fuel flow makes it possible to supply the fuel to the engine cylinders with only one pressure drop in the fuel supply system up to the nozzles. Since each such pressure drop has a tendency to cause vaporization of the fuel and hence to produce inaccurate fuel metering, it may be seen that a sampler type system, such as that illustrated in Figure 1, has a considerable advantage over conventional types of fuel supply systems.

Figures 2 and 3

There is shown in Figure 2 a carburetor for an internal combustion engine equipped with a fluid distributor mechanism for supplying a supplementary fluid directly to the cylinders of the engine. The distributor itself is shown in detail in Figure 3.

In Figure 2, combustion air flowing to the engine passes through a venturi 100 and a passage 102 having a throttle 104 and a fuel discharge nozzle 106.

The air differential pressure created by the venturi 100 creates a flow of air through a secondary air passage which may be traced from impact tubes 108 through a conduit 110, a chamber 112 in a fuel meter generally indicated at 114, a restriction 116, another chamber 118, a conduit 120, past a valve 122, into a chamber 124 and thence through a conduit 126 to the throat of venturi 100. The valve 122 is positioned by a bellows 128 mounted in the chamber 124. The function of the bellows 128 and the valve 122 is to reduce the total pressure differential produced by the venturi 100 by an amount sufficient to correct for changes in the temperature and density of air, so that the pressure drop appearing across restriction 113 is a measure of the mass of air flowing through the venturi 100 per unit time. The pressure drop across restriction 116 is applied to a diaphragm 130 which separates the chambers 112 and 118. The diaphragm 130 is attached at its center to the stem 132 of a pilot valve 134.

Fuel flowing to the engine comes from a suitable pump or other source of fuel under pressure and flows through a conduit 136, a flow controlling valve 138, a conduit 140, a mixture control 142, a jet system 144, an idle valve 146, a pressure regulating valve 148, and a conduit 150 to the fuel discharge nozzle 106.

The fuel flow regulator 138 includes a diaphragm 152, separating a pair of expansible chambers 154 and 156. These chambers are connected by a restriction 158. The diaphragm 152 is attached at its center to a valve 160, which controls the flow of fuel from conduit 136 into conduit 140. The chamber 156 is connected to conduit 140. The chamber 154 is connected through conduits 162 and 164 to a chamber 166 in the fuel meter 114.

The chamber 166 is separated from chamber 118 by a flexible diaphragm 168. The fuel meter 114 also includes a chamber 170 separated from chamber 112 by a diaphragm 172. A spring 174 biases the valve 134 toward closed position. The chamber 170 is connected through a conduit 176 to the conduit 149 on the downstream side of the jet system 144.

The mixture control 142 includes a disc valve 178, movable between the position shown in full lines in the drawing, hereinafter termed its lean position, and a position shown in dotted lines in the drawing, hereinafter termed its rich position. When the mixture control valve 178 is in its lean position, fuel can flow from the mixture control 142 to the jet system 144 only through a conduit 180. When the mixture control valve 178 is in its rich position, fuel can flow to the jet system either through conduit 180 or through a conduit 182.

Fuel entering the jet system 144 through conduit 180 passes either through a fixed restriction 184 or through a restriction 186 controlled by an enrichment valve 188, biased to closed position by a spring 190. Fuel flowing to the jet system 144 through conduit 182 passes through a fixed restriction 192. Fuel flowing through the restrictions 186 and 192 also flows through a restriction 194.

The idle valve 146 is normally open, but moves toward its closed position as the throttle moves into a range of positions adjacent its closed position, so as to regulate the fuel flow. At such times, the air pressure differential set up by the venturi is an unreliable indication of the air flow. Therefore, it is considered better to increase the opening of valve 160 disproportionately to the air pressure differential set up by the venturi, and to regulate the fuel flow by means of the idle valve 146, which is connected to the throttle by means of a link 198. The disproportionate increase in the opening of valve 116 is secured by the use of the springs 155 and 174, which bias their associated valves in a fuel flow increasing direction.

The pressure regulator 148 includes a diaphragm 200 separating a pair of expansible chambers 202 and 204. The diaphragm 200 is attached at its center to a valve 206. A spring 208 biases the valve 206 toward closed position. The chamber 204 receives fuel from conduit 149. The chamber 202 is connected through a conduit 210 to the conduit 110.

The conduit 162 is connected by a conduit 212 to a fluid distributing and regulating mechanism illustrated in detail in Figure 3. The distributor 214 receives fluid to be distributed to the cylinders of the engine from a tank 216 thru a pump 217 and a conduit 218. A pressure relief valve 219 is provided to maintain a substantially constant discharge pressure at the pump 217. The distributor 214 distributes the fluid to lines 220 leading to the respective engine cylinders, in quantities determined by the pressure in conduit 212.

The pump 217 and the distributor 214, which are shown diagrammatically in Figure 2, are set forth in detail in Figures 3 and 7. The distributor 214 is built in a housing 221 attached by means of bolts 222 to a housing 224 containing the pump 217, of generally conventional design. The pump 217 includes a rotor 228 driven by a shaft 230, which is splined at its end so that it may be readily driven thru a suitable connection from the engine.

The pump receives fuel thru an inlet connection 221 and discharges it thru an outlet 223. The pump discharge pressure is regulated by a relief valve generally indicated at 219. Fluid at the pump discharge pressure flows into a relief passage 225, where it acts upwardly on the under side of a valve 227. The upper surface of valve 227 is attached to a guide 229. The guide 229 and valve 227 are biased in a valve closing direction by a spring 231. The upper end of spring 231 acts against a retainer nut 233, which is held against rotation by diametrically opposite projections 235, which slide in grooves in the valve cover 241. The nut 233 is vertically adjustable to vary the spring tension by means of a screw 237 on which the nut 233 is threaded. The screw 237 is provided with a flange 239 which may be clamped between the valve cover 241 and a locking cap 243 to hold the nut 233 in any adjusted position. The valve 227 and guide 229 are balanced against pump inlet pressure.

A by-pass valve 245 is provided in the form of a thin disk biased upwardly against the under side of valve 227 by means of a spring 247. The disk valve 245 closes apertures in the valve 227. If for any reason the pump inlet pressure becomes greater than the discharge pressure, the valve 245 opens, allowing fluid to by-pass the pump. This arrangement is useful when two pumps are connected in series in a fluid line. If one pump fails to operate for some reason, the by-pass valve on that pump opens to allow the other pump to move fuel past it.

If the pump discharge pressure tends to increase above the value established by the force of spring 231, the relief valve opens, allowing part of the fuel discharged to return to the pump inlet. The valve continues to open wider until the pump discharge pressure is reduced to a value which just balances the force of spring 231. Therefore the pump discharge pressure is held at a substantially constant value.

The opposite end of rotor 228 is drivingly connected to a shaft 232, which turns in a bearing 234 in the housing 220. A collar 236 is threaded on the right end of shaft 232. Another collar 238 surrounds the shaft 232 between collar 236 and bearing 234. A flexible diaphragm 240 is clamped between the collars 236 and 238. The outer edge of diaphragm 240 is clamped between a pair of rings 242 and 244, which are press fitted together in nesting relationship. The left end of the ring 244 has a sliding contact with a stationary seal ring 246. The diaphragm 240, and the running seal together prevent leakage of fluid along the outside of shaft 232. A spring 248 is retained between the collar 236 and the ring 244 to maintain the running seal surfaces in engagement.

A piston rod 250 is provided with a squared end 252 slidable in a square recess at the axis of shaft 232. The other end of rod 250 is attached to a piston 253. The rod 250—252 and the piston 253 continuously rotate with the shaft 232. The piston 253 is provided with a skirt 254 which is slotted, as at 256, to provide fluid communication between the chamber 274 at the right end of piston 253 and a plurality of ports 260 which extend through to the wall of the cylinder 258 in which the piston 253 rotates.

A spring 262 retained between the collar 236 and the piston 252 biases the latter for movement to the right, in a direction such that the end of the slot 256 tends to close the ports 260.

Fluid entering the distributor 214 for distribution thereby passes from conduit 218 into a cylinder 264. A piston 266 is movable within the cylinder 264. A fixed restriction 268 provides fluid communication between the opposite sides of the piston. The lower edge of the piston 266 serves as a valve to control the area of a number of ports 270. The ports 270 pass through the walls of the cylinder 264 and lead to a recess 272 which communicates with the chamber 274 on the right hand side of the piston 253.

Another piston 276 is located in the cylinder 264. The piston 276 is biased upwardly by a spring 278. Another spring 280 is retained between the upper surface of the piston 276 and the lower surface of the piston 266. The space under the piston 276 is subject to the pressure in the conduit 212, to which it is connected.

It may be seen that fluid entering the distributor 214 flows through conduit 218, cylinder 264, restriction 268, ports 270, recess 272, chamber 274, and out through the ports 260 to the respective cylinders of the engine. The quantity of fluid discharged through the ports 260 depends upon the pressure available in the chamber 274 to act on the piston 252 and compress the spring 262. That pressure is controlled by the piston 266 which acts as a valve to control the area of the ports 270. The piston 266 is positioned by the pressure drop across restriction 268, which pressure drop is opposed by spring 280. The pressure drop across restriction 268 is a measure of the rate of flow of fluid through that restriction. For any given setting of the spring 280 the piston 266 will assume a position where the fluid flow through restriction 268 and ports 270 is just enough so that the pressure drop across restriction 268 balances the force of spring 280. The force of spring 280 and hence the rate of flow of fluid through the distributor 214 is determined by the pressure in conduit 212, which acts on the piston 276 to set the position of the lower end of spring 280. The amount of fluid discharged to the engine by the distributing mechanism 214 is therefore proportional to the pressure in conduit 212.

A restriction 282 is shown in each of the ports 260. These restrictions are removable, and may be utilized to increase the amount of fluid flow to one or more of the cylinders relative to the amount supplied to the other cylinders. It has been found that in a modern aircraft engine having a large number of cylinders, certain cylinders tend to run hot, either because of uneven cooling or because of the uneven fuel distribution to the cylinders. When this condition occurs the mechanism shown may be utilized to supply an additional amount of fluid to the cylinders which are running hot.

It is well known that an increase in the richness of the fuel and air mixture supplied to an engine will make the mixture burn at a lower temperature, and hence will lower the engine temperature. When the distributor is used to distribute fuel, the tank 216 may be one of the regular fuel tanks, or conduit 218 may be connected directly to conduit 136. Pump 217 may then be the usual engine fuel pump.

The device shown in Figure 3 may alternatively be used to supply an anti-knock fluid of some kind to the cylinders of the engine. For example, the fluid may be water or a water and alcohol mixture.

Operation of Figures 2 and 3

The pressure in chamber 154 of the fuel flow regulator 138 is a measure of the pressure in chamber 156, since the difference between these two pressures is the force of spring 155 which may be considered as being constant without appreciable error.

The pressure drop across the jet system 144 may be taken as a measure of flow of fuel to the engine, as long as the area of the metering restriction open to the flow of fuel remains constant. Since the pressure on the downstream of the jet system is maintained substantially constant by the regulator 148, the pressure on the upstream side of the jet system may itself be used as a measure of the fuel flow. Furthermore, as set forth above, the pressure in chamber 154 is a measure of the pressure in chamber 156, which is substantially the same as the pressure on upstream side of the jet system. Therefore the pressure of chamber 154 may be used as a measure of the rate of fuel flow to the engine. The pressure of chamber 154 is transmitted through conduits 162 and 164 to chamber 166 in the fuel meter 114.

The valve 134 in the fuel meter 114 is positioned in accordance with the difference between two pressure differentials. The air pressure differential acting downwardly on diaphragm 130 is a measure of the rate of flow of air to the engine, and the fuel pressure differential between chambers 166 and 170, which acts upwardly on the valve 134, and is a measure of rate of fuel flow to the engine. The position of valve 134 determines the pressure in chamber 166 and hence the pressure in chamber 154 and thereby the rate of fuel flow. It may therefore be seen that the fuel meter 114 acts to maintain a constant ratio between the fuel flow and the air flow. This ratio may, of course, be varied by operation of the mixture control valve 178, or by opening of enrichment valve 188, which occurs at high fuel pressure differentials. Furthermore, since the fuel pressure in conduit 212 and conduit 162 is communicated through conduit 212 to the fluid distributor 214, it may be seen that the amount of fluid distributed directly to the cylinders is maintained proportional to the rate of flow of air to the engine, and hence, for a given open area of the fuel metering restriction, proportional to the rate of flow of fuel to the engine.

Figure 4

There is illustrated in Figure 4 a discharge nozzle which may be used with either of the distributor systems of Figures 1 and 2. This nozzle is shown as being mounted in a casting 300, which may be part of either a cylinder head or air intake manifold. The nozzle receives fuel through a supply line 302 which may correspond either to the supply line 59 of Figure 1 or the supply lines 220 of Figures 2 and 3. The line 302 connects with a chamber 304. The nozzle includes a valve head 306 and a stem 308. The stem is provided with a central passage, so that the upper end of the stem is subject to the same pressure as the lower end. A spring 312 biases the valve head 306 to closed position. The stem is fluted as at 314 to provide a fluid communication between the chamber 304 and a chamber 316 in back of the head 306.

It may be seen that when fuel is supplied under pressure to the line 302 this pressure is communicated through the flutes 314 to the chamber 316, where it acts on the head 306 in an opening direction. As the valve 306 opens, the pressure in chamber 316 is relieved. If the pressure in the line 302 increases, the valve will open wider, compressing the spring 312 more, and relieving the increased pressure. It may therefore be stated that the pressure in line 302 is maintained substantially constant at a value determined by the strength of spring 312.

Figure 5

There is shown in Figure 5 an arrangement wherein the fuel discharge nozzle is combined with the exhaust valve of the engine. An exhaust valve having a head 320 and a stem 322 is shown as mounted in a casting 324, which may be the head or block of an engine. A hardened valve seat 326 is provided. The valve 320 controls communication between the cylinder 328 and an exhaust passage 330. The valve head 320 and the stem 322 are hollow to allow the flow of fuel therethrough.

There is mounted in the head 320 a nozzle valve 332, biased to closed position by a spring 334. The stem 322 reciprocates in a guide sleeve 336. A chamber 338 formed in the guide sleeve is connected to a fuel supply conduit 340. The valve stem 322 is provided with ports 342, which provide communication between the chamber 338 and the hollow stem of the valve whenever the exhaust valve head 300 rests on its seat 326. Suitable springs 344 and 346 are provided to insure seating of the exhaust valve, which may be opened by suitable cam mechanism (not shown in the drawing).

When nozzles of the type shown in Figure 5 are used with either of the distributor systems of Figures 1 and 3, the distributor mechanism should be arranged to open the supply lines 340 to the flow of fuel before the ports 342 are opened by the closing of the exhaust valve.

When a conduit filled with fluid is suddenly connected to a source of fluid under high pressure, a pressure wave, or shock wave, is transmitted throughout the length of the conduit. If the conduit is closed at the other end, the wave may be reflected back toward its source. There may be several successive reflections from the opposite ends of the conduit before the energy of the wave is dissipated. If a spring loaded valve, such as the valve 306 of Figure 4, is located at the other end of the conduit, it will open suddenly as each successive shock wave strikes it, and will close just as suddenly because the influence of the shock wave is only momentary. An undesirable vibration condition at the valve may be set up, particularly if the length of the conduit is so related to the speed of the wave, the strength of the spring on the valve, etc., as to aid in the establishment of a resonant condition. Such vibrations tend to interfere with proper fuel distribution, since the lines between the distributor and the cylinders are of different lengths and conformations, and therefore the vibration characteristics of each nozzle valve are different, resulting in a different flow of fuel from each nozzle.

When the nozzle of Figure 5 is used, the distributor may be arranged to open the supply line 340 a substantial interval before the port 342 is opened by the closing of the exhaust valve, so that any pressure wave set up by the action of the distributor is dissipated before the port 342 is opened. Any pressure wave caused by opening of port 342 is the same for all cylinders, since the length of the fuel passage between port 342 and nozzle valve 332 is the same, and the springs on all the nozzle valves are alike. Hence, pressure waves caused by opening of port 342 do not affect the fuel distribution. The use of a nozzle such as that shown in Figure 5 therefore promotes even distribution of fuel to the various cylinders.

The exhaust valve structure of Figure 5 is also advantageous in that the flow of fuel through the valve tends to cool it. Furthermore, the fuel is heated in passing through the exhaust valve, and therefore vaporizes more easily when it is released into the engine cylinder.

Figure 6

There is illustrated in Figure 6 a different type of fuel distributing mechanism, which may be used in place of the distributor shown in Figure 1. Since the fuel metering system used in the device of Figure 6 is the same as that of Figure 1, the various fuel conduits and connections of Figure 6 have been given the same reference characters as the corresponding elements in Figure 1.

There is shown in Figure 6 a multiple plunger fuel injection pump. The pump mechanism is contained in a cylindrical casing 408 and includes a plurality of plungers 400 which are spaced circumferentially in the casing 408. The plunger 400 is biased to the right by a spring 402. A cam 404 driven by a shaft 406 connected to the engine operates to sequentially reciprocate the plungers 400. A piston 412 is movable within the cylindrical casing 408. The piston 412 is provided with a series of spaced apertures 410, which are aligned with the plungers 400. The apertures 410 form end portions of the pump cylinders in which the plungers 400 work. There are mounted in the piston 412 a plurality of check valves, one for each pump cylinder, one of which is shown at 414. During the retracting strokes of the pump plungers, these check valves admit fuel from the chamber 416 at the right of the piston 412 to a passage 418, which leads to one of the pump cylinders 410.

During the pumping strokes, the check valves 414 are closed by the pressure developed ahead of the plungers. Each plunger is provided with a pressure relief port 420 which provides communication between the end portion 410 of the pump cylinder and the chamber 416 when the plunger reaches a predetermined point in its travel. The pumping end of each plunger is fluted, as shown at 411. When the ends of the flutes pass inside the piston 412, the plunger begins to pump. The point in the plunger stroke where pumping starts may therefore be varied by moving the piston 412. Since pumping is always terminated at the same point of the plunger stroke, it may be seen that the effective stroke of the plungers is varied by positioning the piston 412.

The piston 412 is positioned by the difference between the pressure in the chamber 416 and the pressure in chamber 422 on the left hand side of the piston. Since the pressure in chamber 416 is higher, as it is connected directly to the fuel supply pump, this pressure differential acts to the left, and is opposed by a spring 424. A passage 426 including a restriction 428 provides communication between the chambers 416 and 422. The pressure differential between these two chambers controls the movements of piston 412 in the same manner that the pressures in chambers 42 and 44 control the movements of piston 46 of Figure 1. Likewise, the difference between these two pressures is controlled in the same way as the difference between the corresponding pressures in Figure 1.

The number of plungers 400 is greater by one than the number of cylinders in the engine. The extra plunger is used to supply a sampler line 74, which corresponds to the sampler line 74 in Figure 1. Since the sampler line 74 of Figure 6 is not connected to an expansible chamber such as the chamber 66 of Figure 1, a vapor dome 430 is provided to reduce the pulsations in the sampler lines because of the intermittent supply of fuel thereto.

It should be readily understood that the injector pump system of Figure 7 is not limited in its utility to the particular type of metering or control system of Figure 1 or the use of any system employing the sampler principle. For example, it might be used in any system using a conventional type of fuel injector pump mechanism. The piston 412 could be positioned either mechanically or by a pressure differential balanced by a spring as in the present illustration.

While I have shown and described certain preferred embodiments of my invention, other modifications thereof will readily occur to those skilled in the art, and I therefore intend my invention to be limited only by the appended claims.

I claim as my invention:

1. A fuel supply system for an internal combustion engine, comprising fuel distributing mechanism driven by said engine for sequentially discharging equal amounts of fuel to the several cylinders of said engine, control means associated with said distributing mechanism for simultaneously varying the amounts discharged to all said cylinders, fuel metering apparatus, sampler means for discharging to said fuel metering apparatus an amount of fuel equal to the amount of fuel discharged to one of said cylinders, an air induction conduit for said engine, means for measuring the flow of air thru said conduit, means associated with said air flow measuring means and said fuel metering apparatus for comparing the air and fuel flows and for operating said control means in accordance with said comparison to maintain a substantially constant fuel-to-air ratio.

2. A fuel supply system for a multiple cylinder internal combustion engine, comprising a control cylinder having a row of circumferentially spaced ports extending through the side walls thereof, passage means connecting the respective ports to the respective engine cylinders, a piston in said cylinder, a slot in the lateral surface of said piston extending longitudinally of said piston from one end thereof, means for rotating said piston so that said slot successively uncovers said ports, means for supplying the end of said control cylinder adjacent said one end of said piston with fluid fuel under pressure so that when any of said ports is uncovered its associated engine cylinder is supplied with fuel, and means for translating said piston to vary the amount of fuel supplied to said engine cylinders.

3. A fuel supply system for an internal combustion engine, comprising fuel distributing mechanism driven by said engine for sequentially discharging equal amounts of fuel to the several cylinders of said engine, control means associated with said distributing mechanism for simultaneously varying the amounts discharged to all said cylinders, fuel metering apparatus, sampler means associated with said distributing mechanism for discharging to said fuel metering apparatus an amount of fuel proportional to but less than the amount of fuel discharged to all said cylinders, and means including said fuel metering apparatus for operating said control means.

4. A fuel supply system for an internal combustion engine, comprising fuel distributing mechanism driven by said engine for sequentially discharging equal amounts of fuel to the several cylinders of said engine, first control means associated with said distributing mechanism for simultaneously varying the amounts discharged to all said cylinders, fuel metering apparatus, sampler means associated with said distributing mechanism for discharging to said fuel metering apparatus an amount of fuel proportional to but less than the amount of fuel discharged to all said cylinders, an air induction conduit for said engine, means for measuring the flow of air through said conduit, second control means for varying the flow of air through said conduit, manual means for operating one of said control means and means associated with said air flow measuring means and said fuel metering apparatus for comparing the air and fuel flows, and for operating the other of said control means in accordance with said comparison to maintain a substantially constant fuel-to-air ratio.

5. A fuel supply system for a multiple cylinder internal combustion engine, comprising fuel distributing mechanism driven by said engine for sequentially discharging equal amounts of fuel to the several cylinders of said engine, means for supplying fuel to said distributing mechanism at a substantially constant pressure, a first expansible chamber, conduit means including a fixed restriction for supplying fuel to said chamber from said supply means, a valve for discharging fuel from said chamber, means responsive to the difference between the pressure in said chamber and said constant pressure for controlling said fuel distributing mechanism to simultaneously vary the amounts of fuel discharged to all said cylinders, a second chamber, sampler means associated with said distributing mechanism for discharging to said second chamber an amount of fuel proportional to but less than the amount discharged to all said cylinders, a metering restriction connecting said first and second chambers and serving as an outlet for said second chamber, means for measuring the rate of flow of combustion air to said engine, and means responsive to the rate of air flow and to the pressure drop across said metering restriction for operating said valve to control the pressure in said first chamber and thereby said fuel distributing mechanism to maintain a substantially constant fuel-to-air ratio.

6. A fuel supply system for a multiple cylinder internal combustion engine, comprising fuel distributing mechanism including a control cylinder having a row of circumferentially spaced ports extending through the side walls thereof, passage means connecting the respective ports to the respective cylinders of said engine, said ports being greater in number by one than the cylinders of said engine, a piston in said cylinder, a skirt at one end of said piston forming a central recess on said end, a slot through said skirt to provide fluid communication between said recess and the side wall of said cylinder, said piston being connected to said engine for rotation therewith so that said slot successively uncovers said ports, means for supplying the end of said cylinder adjacent said one end of the piston with fluid fuel at a substantially constant pressure so that when any of said ports is uncovered fuel is discharged through it, conduit means including a fixed restriction for connecting said constant pressure end of said cylinder to the other end thereof, a valve for discharging fuel from said other end of said cylinder, said piston being translatable by the difference between the pressure in said other end and said constant pressure so that the end of said slot varies the effective area of said ports and thereby varies the amounts of fuel discharged to all said cylinders, a chamber, means connecting said one extra port to said chamber for discharging to said chamber an amount of fuel proportional to but less than the amount discharged to all said cylinders, a metering restriction connecting said chamber with said other end of said cylinder and serving as an outlet for said chamber, means for measuring the rate of flow of combustion air to said engine, and means responsive to the rate of air flow and to the pressure drop across said metering restriction for operating said valve to control the pressure in said other end of said cylinder and thereby the position of said piston to maintain a substantially constant fuel-to-air ratio.

7. A fuel supply system for a multiple cylinder internal combustion engine, comprising fuel injection pump mechanism including a plurality of circumferentially spaced pump cylinders and plungers reciprocable therein, a discharge means connecting the respective pump cylinders to the respective cylinders of said engine, said pump cylinders being greater in number by one than the cylinders of said engine, a piston having apertures therein for receiving said plungers, said apertures forming end portions of said pump cylinders, cam means driven by said engine for successively reciprocating said plungers, said piston forming one wall of a chamber through which all said plungers pass, inlet passage means in said piston for supplying said end portions with fuel, pressure relief ports in said plungers for relieving pressure in said end portions when said relief ports are open to said chamber, means for supplying said chamber with fluid fuel at a substantially constant pressure, conduit means including a fixed restriction for connecting said constant pressure chamber to a second chamber on the opposite side of said piston, a valve for discharging fuel from said second chamber, said piston being translatable by the difference between the pressures in said chambers so that said piston varies the point in the travel of said plungers at which said relief ports are uncovered and thereby varies the amounts of fuel discharged to all said engine cylinders, a third chamber, means connecting said one extra pump cylinder to said third chamber for discharging thereto an amount of fuel proportional to but less than the amount discharged to all said engine cylinders, a metering restriction connecting said third chamber with said second chamber and serving as an outlet for said third chamber, means for measuring the rate of flow of combustion air to said engine, and means responsive to the rate of air flow and to the pressure drop across said metering restriction for operating said valve to control the pressure in said second chamber and thereby the position of said piston to maintain a substantially constant fuel-to-air ratio.

8. A fuel supply system for a multiple cylinder internal combustion engine, nozzle means for each of said cylinders for supplying fuel thereto, a fuel supply line for each of said nozzle means comprising fuel distributing mechanism connected to said lines and driven by said engine for sequentially discharging equal amounts of fuel into said supply lines, said nozzle means including mechanism for maintaining a first substantially constant pressure in said supply lines, fuel means for supplying fuel to said distributing mechanism at a second substantially constant pressure, a first expansible chamber, conduit means including a fixed restriction for supplying fuel to said chamber from said supply means, a valve for discharging fuel from said chamber, means responsive to the difference between the pressure in said chamber and said second constant pressure for controlling said fuel distributing mechanism to simultaneously vary the amounts of fuel discharged to all said cylinders, a second chamber, sampler means associated with said distributing mechanism for discharging to said second chamber an amount of fuel proportional to but less than the amount discharged to all said cylinders, a metering restriction connecting said first and second chambers and serving as an outlet for said second chamber, said sampler means and said valve cooperating to maintain the pressure in said second chamber substantially equal to said first constant pressure, means for measuring the rate of flow of combustion air to said engine, and means responsive to the rate of air flow and to the pressure drop across said metering restriction for operating said valve to control the pressure in said first chamber and thereby said fuel distributing mechanism to maintain a substantially constant fuel-to-air ratio.

9. A fuel supply system for a multiple cylinder internal combustion engine, comprising fuel distributing mechanism including a control cylinder having a row of circumferentially spaced ports extending through the side walls thereof, said ports being greater in number by one than the cylinders of said engine, nozzle means for each of said engine cylinders for supplying fuel thereto, supply lines connecting each of said nozzle means to one of said ports, said nozzle means including mechanism for maintaining a first substantially constant pressure in said supply lines, a piston in said control cylinder, a skirt at one end of said piston forming a central recess on said end, a slot through said skirt to provide fluid communication between said recess and the side wall of said cylinder, said piston being connected to said engine for rotation therewith so that the said slot successively uncovers said ports, means for supplying the end of said cylinder adjacent said one end of the piston with fluid fuel at a second substantially constant pressure higher than said first pressure so that when any of said ports is uncovered fuel is discharged through it, conduit means including a fixed restriction for connecting said constant pressure end of said cylinder to the other end thereof, a valve for discharging fuel from said other end of said cylinder, said piston being translatable by the difference between the pressure in said other end and said constant pressure so that the end of said slot varies the effective area of said ports and thereby varies the amounts of fuel discharged to all said cylinders, a chamber, means connecting said one extra port to said chamber for discharging to said chamber an amount of fuel proportional to but less than the amount discharged to all said cylinders, a metering restriction connecting said chamber with said other end of said cylinder and serving as an outlet for said chamber, said piston and said valve being effective to control the pressure in said chamber to maintain it substantially equal to said first constant pressure, means for measuring the rate of flow of combustion air to said engine, and means responsive to the rate of air flow and to the pressure drop across metering restriction for operating said valve to control the pressure in said other end of said cylinder and thereby the position of said piston to maintain a substantially constant fuel-to-air ratio.

10. A fuel supply system for a multiple cylinder internal combustion engine, comprising exhaust valves for the cylinders of said engine, a fuel injection nozzle for each cylinder mounted in the exhaust valve of said cylinder, a fuel inlet line for each nozzle including a passage extending through the stem of its associated exhaust valve, a fuel injection initiating valve formed in said exhaust valve stem and adapted to open said passage as said exhaust valve closes, a plurality of lines for supplying fuel to said initiating valves, fuel injection terminating valve mechanism connected in said lines in series with said initiating valves, and means driven by said engine for operating said terminating valve mechanism to open each said line before the initiating valve therefor opens, and to close each said line before the initiating valve therefor closes.

11. A fuel supply system for a multiple cylinder internal combustion engine, comprising a control cylinder having a row of circumferentially spaced ports extending through the side walls thereof, passage means connecting the respective ports to the respective cylinders of said engine, a piston in said control cylinder, a slot in the lateral surface of said piston extending longitudinally of said piston from one end thereof, rotary pump means for supplying the end of said cylinder adjacent said one end of said piston with fluid fuel under pressure so that when any of said ports is uncovered its associated engine cylinder is supplied with fuel, means including a single shaft driven by said engine for rotating said pump and said piston, said slot being effective on rotation of said piston to successively uncover said ports and means for translating said piston to vary the amount of fuel supplied to said cylinders.

12. A fuel supply system for an internal combustion engine, comprising a fuel conduit, valve mechanism for controlling the flow of fuel through said conduit including a control cylinder, a piston translatable in said cylinder and separating two expansible chambers formed between the ends of said piston and the ends of said cylinder, a port extending through a wall of one of said chambers, said piston being effective upon translation thereof to vary the opening thereof and control said fuel flow, means driven by said engine for rotating said piston to prevent a sticking thereof, and means for applying an additional controlling force to said piston acting in opposition to the difference in pressure between said chambers.

13. A fuel supply system for an internal combustion engine, comprising an air induction system, means for discharging fuel into the air flowing through said induction system, means for controlling the amount of fuel so discharged to maintain a substantially constant fuel-to-air ratio, means for distributing a fluid directly to the several cylinders of said engine, and means responsive to the rate of discharge of fuel into said air induction system for controlling the rate of discharge of fluid directly into said engine cylinders.

14. Fuel injection pump mechanism, comprising a plurality of circumferentially spaced pump cylinders and plungers reciprocable therein, a piston having apertures therein for receiving said plungers, said apertures forming end portions of said pump cylinders, cam means driven by said engine for reciprocating said plungers, said piston forming one wall of a chamber through which all said plungers pass, inlet passage means in said piston for supplying said end portions with fuel, pressure relief ports in said plungers for relieving pressure in said pump cylinders when said relief ports are open to said chamber, means for supplying said chamber with fluid fuel, said piston being effective upon translation thereof to vary the point in the travel of said plungers at which said relief ports are covered, and means for varying the pressure differential acting on opposite faces of said piston to cause translation thereof and thereby to control the flow of fuel through said pump mechanism.

15. A fuel supply system for a multiple cylinder internal combustion engine, comprising fuel distributing mechanism driven by said engine for sequentially discharging equal amounts of fuel to the several cylinders of said engine, means for supplying fuel to said distributing mechanism at a substantially constant pressure, a first expansible chamber, conduit means including a fixed restriction for supplying fuel to said chamber from said supply means, a valve for discharging fuel from said chamber, means responsive to the difference between the presure in said chamber and said constant pressure for controlling said fuel distributing mechanism to simultaneously vary the amounts of fuel discharged to all said cylinders, a second chamber, sampler means associated with said distributing mechanism for discharging to said second chamber an amount of fuel proportional to but less than the amount discharged to all said cylinders, a metering restriction connecting said first and second chambers and serving as an outlet for said second chamber, means for measuring the rate of flow of combustion air to said engine, means responsive to the rate of air flow and to the pressure drop across said metering restriction for operating said valve to control the pressure in said first chamber and thereby said fuel distributing mechanism to maintain a substantially constant fuel-to-air ratio, and means for delaying the response of said valve operating means to said pressure drop so that upon an increase in air flow to said engine a temporary increase in the fuel-to-air ratio is produced.

16. A fuel supply system for a multiple cylinder internal combustion engine, comprising fuel distributing mechanism driven by said engine for sequentially discharging equal amounts of fuel to the several cylinders of said engine, means for supplying fuel to said distributing mechanism at a substantially constant pressure, a first expansible chamber, conduit means including a fixed restriction for supplying fuel to said chamber from said supply means, a valve for discharging fuel from said chamber, means responsive to the difference between the pressure in said chamber and said constant pressure for controlling said fuel distributing mechanism to simultaneously vary the amounts of fuel discharged to all said cylinders, a second chamber, sampler means associated with said distributing mechanism for discharging to said second chamber an amount of fuel proportional to but less than the amount discharged to all said cylinders, a metering restriction connecting said first and second chambers and serving as an outlet for said second chamber, said sampler means and said first chamber pressure having simultaneous and opposite effects on said second chamber pressure so that the latter is maintained substantially constant, means for applying a force due to the pressure in said second chamber to said pressure difference responsive means in a direction to vary the fuel flow to maintain said second chamber pressure constant, means for measuring the rate of flow of combustion air to said engine, and means responsive to the rate of air flow and to the pressure drop across said metering restriction for operating said valve to control the pressure in said first chamber and thereby said fuel distributing mechanism to maintain a substantially constant fuel-to-air raio.

17. A fuel supply system for a multiple cylinder internal combustion engine, comprising fuel distributing mechanism driven by said engine for sequentially discharging equal amounts of fuel to the several cylinders of said engine, means for supplying fuel to said distributing mechanism at a substantially constant pressure, a first expansible chamber, conduit means including a fixed restriction for supplying fuel to said chamber from said supply means, a valve for discharging fuel from said chamber, means responsive to the difference between the pressure in said chamber and said constant pressure for controlling said fuel distributing mechanism to simultaneously vary the amounts of fuel discharged to all said cylinders, a second chamber, sampler means associated with said distributing mechanism for discharging to said second chamber an amount of fuel proportional to but less than the amount discharged to all said cylinders, a metering restriction connecting said first and second chambers and serving as an outlet for said second chamber, and means responsive to the pressure drop across said metering restriction for operating said valve to control the pressure in said first chamber and thereby said fuel distributing mechanism.

18. Apparatus for controlling the distribution of fluid to a plurality of fluid receiving conduits, comprising distributing mechanism for sequentially discharging equal amounts of fuel to the several receiving conduits, control means associated with said distributing mechanism for simultaneously varying the amounts discharged to all said conduits, fluid metering apparatus, sampler means for discharging to said fluid metering apparatus an amount of fluid equal to the amount discharged to one of said receiving conduits, and means including said fluid metering apparatus for operating said control means.

19. A fuel control system for an internal combustion engine, comprising fuel distributing mechanism including a control cylinder having circumferentially spaced ports extending through the side walls thereof and adapted for connection to the several cylinders of the engine, a piston mounted for both translation and rotation in said control cylinder, said piston having a slotted portion to provide communication between a portion of said control cylinder and the respective ports during rotation of said piston, said portion of said control cylinder having a fuel inlet port, means for supplying said inlet port with fuel under pressure, a valve for controlling the opening of said port for varying the fuel pressure on said piston, means connected to said valve and responsive to the differential pressure of fuel flowing to said port for shifting said valve in a given direction to vary the pressure on said piston, and means responsive to the differential pressure of air flowing to the engine for shifting said valve in the opposite direction.

20. A fuel control system for an internal combustion engine, comprising rotary means for controlling the supply of fuel to the engine cylinders, said rotary means being mounted for translatory movement in response to fuel pressure for varying the amounts of fuel supplied to said cylinders, means for supplying fuel to said rotary means and including a port, a valve movable with respect to said rotary means to vary the opening of said port for altering the fuel pressure acting on said rotary means, means responsive to differential pressure corresponding to the flow of fuel to said port for shifting said valve in one direction, and means responsive to differential pressure corresponding to the flow of air to the engine for shifting said valve in the opposite direction.

21. A fuel control system for an internal combustion engine, comprising rotary means for controlling the supply of fuel to the engine cylinders, said rotary means being mounted for translatory movement in response to fuel pressure for varying the amounts of fuel supplied to said cylinders, means for supplying fuel to said rotary means and including a port, a valve movable with respect to said port to vary the fuel pressure acting on said rotary means, an element connected to said valve and movable with respect to said rotary means to shift said valve in response to variations in the differential pressure of fuel flowing to said port, and a second element connected to said valve for shifting the latter in response to variations in the differential pressure of air flowing to the engine.

22. A fuel control system for an internal combustion engine, comprising rotary means for controlling the supply of fuel to the engine cylinders, said rotary means being mounted for translatory movement in response to fuel pressure for varying the amounts of fuel supplied to said cylinders, means for supplying fuel to said rotary means and including a port, a valve movable with respect to said port to vary the fuel pressure acting on said rotary means, an element connected to said valve and movable with respect to said rotary means to shift said valve in response to variations in the differential pressure of fuel flowing to said port, and a second element connected to the first mentioned element for shifting the latter in response to variations in the differential pressure of air flowing to the engine.

23. A fuel control system for an internal combustion engine, comprising rotary means for controlling the distribution of fuel to the engine cylinders, said rotary means being mounted for translatory movement in response to fuel pressure for varying the amounts of fuel supplied to said cylinders, means comprising a metering restriction and a port therebeyond for supplying fuel to said rotary means, a valve movable with respect to said port for varying the fuel pressure acting on said rotary means, means responsive to differential pressure corresponding to the flow of air to the engine for shifting said valve in one direction, and means responsive to the pressure drop across said metering restriction for shifting said valve in the opposite direction.

24. A fuel control system for an internal combustion engine, comprising rotary means for controlling the distribution of fuel to the engine cylinders, said rotary means being mounted for translatory movement in response to fuel pressure for varying the amounts of fuel supplied to said cylinders, means comprising a metering restriction and a port therebeyond for supplying fuel to said rotary means, a valve movable with respect to said port for varying the fuel pressure acting on said rotary means, and means for shifting said valve, said means comprising an element connected to said valve and responsive to the pressure drop across said metering restriction and another element responsive to the rate of air flow to the engine.

25. A fuel control system for an internal combustion engine, comprising a cylinder, a piston movable longitudinally in said cylinder and separating two chambers between the ends of said piston and the ends of said cylinder, one of said chambers having a fuel inlet port and also having a fuel discharge port extending through a wall of said cylinder, said piston being movable longitudinally in said cylinder to vary the opening of said discharge port, a valve movable with respect to said piston for varying the opening of the first mentioned port to alter the fuel pressure acting upon said piston, means connected to said valve and responsive to differential pressure corresponding with the rate of fuel flow through said port for exerting a force upon said valve in a direction for restricting the opening of said port, and other means connected to said valve and responsive to a differential pressure corresponding with the rate of flow of air to the engine for exerting a force upon said valve in a direction for increasing the opening of said port.

LEIGHTON LEE, II.

REFERENCES CITED

The following references are of record in the file of this patent:

UNITED STATES PATENTS

| Number | Name | Date |
| --- | --- | --- |
| 1,490,654 | Wylie | Apr. 15, 1924 |
| 1,528,305 | Ruhmann et al. | Mar. 3, 1925 |
| 2,031,625 | Wild et al. | Feb. 25, 1936 |
| 2,280,386 | Dickson | Apr. 21, 1942 |
| 2,354,693 | Martin | Aug. 1, 1944 |
| 2,378,036 | Reggio | June 12, 1945 |
| 2,378,319 | Olson et al. | June 12, 1945 |
| 2,392,565 | Anderson et al. | Jan. 8, 1946 |